United States Patent
Gillet et al.

(10) Patent No.: US 8,577,608 B2
(45) Date of Patent: Nov. 5, 2013

(54) METHOD OF OBTAINING A LOCAL TERRAIN ELEVATION DATABASE FROM DETECTOR MEANS ON BOARD A VEHICLE

(75) Inventors: Marianne Gillet, Vitrolles (FR);
Francois-Xavier Filias, Pelissanne (FR);
Richard Pire, Istres (FR)

(73) Assignee: Eurocopter, Marignane Cedex (FR)

( * ) Notice: Subject to any disclaimer, the term of this patent is extended or adjusted under 35 U.S.C. 154(b) by 526 days.

(21) Appl. No.: 12/952,574

(22) Filed: Nov. 23, 2010

(65) Prior Publication Data

US 2011/0130895 A1    Jun. 2, 2011

(30) Foreign Application Priority Data

Nov. 30, 2009 (FR) ..................... 09 05766

(51) Int. Cl.
*G06T 5/50* (2006.01)
(52) U.S. Cl.
USPC ............. 701/523; 382/106; 382/154; 342/63; 342/64; 707/918; 707/919
(58) Field of Classification Search
USPC ........... 701/4, 523; 382/106, 154; 342/63, 64; 707/918, 919
See application file for complete search history.

(56) References Cited

U.S. PATENT DOCUMENTS

| | | | |
|---|---|---|---|
| 5,966,678 A | | 10/1999 | Lam |
| 6,108,006 A * | | 8/2000 | Hoppe ........................ 345/423 |
| 7,899,241 B2 * | | 3/2011 | Baxes et al. .................. 382/154 |
| 8,073,579 B2 * | | 12/2011 | Marty et al. ..................... 701/4 |
| 8,351,684 B2 * | | 1/2013 | Clar et al. ..................... 382/154 |
| 2007/0280528 A1 * | | 12/2007 | Wellington et al. ........... 382/154 |

FOREIGN PATENT DOCUMENTS

EP     1243944 A2     9/2002

OTHER PUBLICATIONS

Lux, P.W. et al: "Range imaging for autonomous navigation of robotic land vehicles"; Signal Processing, Elsevier Science Publishers B.V. Amsterdam, NL LNKD-DOI:10.1016/0165-1684(91)90017-D, vol. 22, No. 3, Mar. 1, 1999, pp. 299-311, XP026671937 ISSN: 0165-1894.
Zhang, K. et al: "Comparison of three algorithms for filtering airborne lidar data", Programmetric Engineering and Remote Sensing Mar. 2005 American Society for Photogrammetry and Remote Sensing US, vol. 71, No. 3, Mar. 2005, pp. 313-324.
Search Report in application No. FR 09 05766 filed Jul. 28, 2010.

* cited by examiner

*Primary Examiner* — Thomas Black
*Assistant Examiner* — Peter D Nolan
(74) *Attorney, Agent, or Firm* — Brooks Kushman P.C.

(57) ABSTRACT

A method essentially comprising a step of storing each plot mesh. Each plot mesh receiving plots sent thereto by detector means and retaining in memory at least the altitude of the highest plot and the number of plots neighboring said highest plot in said mesh. The altitude and the number of plots neighboring are updated each time a new plot is sent to the plot mesh. A step of rejecting plot meshes is presenting a number of neighboring plots that is less than a predetermined rejection threshold value. The rejection threshold value is a function of the position of the mesh relative to the detector means. A step is preparing the local terrain elevation database from the plot meshes ($M(i,j)$) that are not rejected.

15 Claims, 2 Drawing Sheets

METHOD OF OBTAINING A LOCAL TERRAIN ELEVATION DATABASE FROM DETECTOR MEANS ON BOARD A VEHICLE

CROSS REFERENCE TO RELATED APPLICATION

This application claims the benefit of patent application no. FR 09 05766 dated Nov. 30, 2009, the disclosure of which is incorporated herein by reference.

FIELD OF THE INVENTION

The inventive method relates to obtaining a local terrain elevation database from detector means on board a vehicle. A device is implementing this method in which the processor unit operates by implementing a corresponding program.

More particularly and in non-limiting manner, the detector means are of the radar or laser telemeter type or of the stereoscopic imaging system type, and the vehicle is an aircraft.

BACKGROUND OF THE INVENTION

In aircrafts, detector means of the radar or laser telemeter type or of the stereoscopic imaging system type are used.

On the basis of range images provided by detector means delivering individual echoes or "plots", it is known to obtain a terrain elevation database for the zone observed by the detector means. The database contains all of the relief of the terrain together with its obstacles. Nevertheless, the databases in the raw state also contains errors due to false echoes and these need to be eliminated or corrected.

This applies particularly in the field of photogrammetry. In photogrammetry, the terrain data is generally acquired by using lidar type scanning sensors (where lidar is short for light detection and ranging) mounted on board aircraft that are also provided with inertial units in order to obtain ground references with the best possible accuracy. In that technique, it is known to filter out false echoes that arrive during detection, preferably by eliminating them, since such echoes disturb measurements of the ground and of objects present thereon.

These echoes may be filtered by a morphological filter. Under such circumstances, on the basis of the acquired data, the images of the surface sheet are encoded on a gray scale and a point is given a value of a density that varies depending on its altitude. By implementing the mathematical morphology operators of erosion and of expansion, false echoes can be eliminated. Such filtering may also be optimized by implementing a progressive morphological filter that varies over time relative to the nature of the terrain.

Other filter means may also be implemented for photogrammetry, e.g. such as linear prediction using the least squares method in iterative manner over the entire surface. This smoothes the terrain model with elevations being averaged out and therefore reduced.

One known filtering solution for photogrammetry is eliminating by point density. That solution proposes subdividing the terrain under study into a two-dimensional grid corresponding to the ground, e.g. a grid made up of equivalent squares having points with different measured altitudes. The points that present a large amplitude difference from the ground are extracted and form frames that make it possible, after processing with gradient operators, to identify points of discontinuity between portions of the ground and a portion that is detached from the ground. The results obtained in that way are filtered to remove sensor noise or various other forms of interfering noise (see in particular the document by P. Axelsson "Processing of laser scan data—algorithms and applications", ISPRS Journal of Photogrammetry and Remote Sensing 54 (1999)).

A second field in which filtering out false echoes is important is the field of detecting obstacles. Under such circumstances, the processing of the values required by the telemetry sensor needs to take place as quickly as possible, and the processing must be capable of being performed on a single scan of the scene by the sensor, for example.

An advantageous method of filtering comprises rectifying the image acquired in a ground Cartesian frame of reference with a ground plan that is subdivided into a grid of squares receiving the points together with their specific altitudes. In each square, the point having the highest altitude is identified and the number of points around this maximum altitude in a predetermined range of heights is taken into consideration. For a given square, if the number of points around this maximum altitude point within the range is less than some fixed value, then the maximum altitude point is eliminated. Otherwise this point is retained as the highest point in said square. Thus, a large fraction of points corresponding to noisy measurements in three-dimensional (3D) space are naturally eliminated from each square (see in particular the document by P. W. Lux and C. H. Schaefer "Range imaging for autonomous navigation of robotic land vehicles", Signal Processing 22, pp. 299-311 (1991)-XP026671937). According to document XP026671937, the altitude of the lowest plot is retained in memory.

The document by K. Zhang et al. "Comparison of three algorithms for filtering airborne lidar data", Vol. 71, No. 3, March 2005, pp. 313-324-XP002592700 describes filtering with the use of two offset grids and plots obtained from a laser scanner. The idea is to avoid blocking effects at the edge of the grid in geological models such as models of floodplains or flooding.

Document EP 1 243 944 describes measuring the range to a target such as a human body, in which provision is made to remove noise components from the images taken. To obtain images, light irradiation is provided and reflected light is sent together with differences in reflection level as a function of range. Image processing subdivides these into unit images. The unit images are discarded if a signal value exceeds a certain threshold. However the unit images are retained if they are below said threshold.

Document U.S. Pat. No. 5,966,678 descries a system of filtering a range image of a target acquired by laser detection in which the erroneous elements in a range image are detected on the basis of a given criterion and are corrected using data for surrounding range images. That system is complicated and correcting the range image using the surrounding images takes time, which is not appropriate for preparing a local terrain elevation database in real time.

The problem of the present invention is to devise a method and a device enabling a terrain elevation database to be obtained in real time for a zone observed by detector means, said database including all of the portions in relief and the obstacles in said zone, together with a reduced number of errors due to false echoes during data acquisition.

To this end, the invention is defined by the claims.

SUMMARY OF THE INVENTION

The invention provides a method of obtaining a local terrain elevation database from detector means on board a vehicle, which means send measurement signals towards the terrain for which the database is to be determined and recover at least some of said signals in the form of range images made up of a plurality of individual sent plots that are expressed in the form of three-dimensional coordinates, said method comprising:

a step of subdividing the terrain in a horizontal plane on the basis of a two-dimensional terrain grid;

a step of storing each mesh in the terrain grid in a plot mesh, each stored plot mesh receiving sent plots from the detector means and retaining in memory at least the altitude of the highest plot and the number of plots neighboring said highest plot in said plot mesh, said altitude and said number being updated for each plot newly sent to the plot mesh;

a step of rejecting plot meshes presenting a number of neighboring plots that is less than a predetermined rejection threshold value; and a step of preparing the local terrain elevation database from the non-rejected plot meshes.

In an example, altitude is updated when the newly-sent plot presents an altitude that is greater than the altitude of the previously stored highest plot.

In an element, the number of neighboring plots is updated when the newly-sent plot presents an altitude difference relative to the altitude of the previously stored highest plot having an absolute value that is less than a predetermined altitude difference value.

In an example, when the newly-sent plot presents an altitude greater than the altitude of the previously stored highest plot, and when their altitude difference exceeds the predetermined altitude difference value, the number of neighboring plots is reset to zero, whereas when said difference is less than the predetermined altitude difference, the new number ($N(i,j)$new) of neighboring plots is calculated from the preceding number ($N(i,j)$old) of neighboring plots using the following equation:

$$N(i,j)\text{new} = 1 + N(i,j)\text{old}$$

In an example, when the newly-sent plot presents an altitude that is lower than the altitude of the previously stored highest plot and when the absolute value of the difference exceeds the predetermined altitude difference value, the number of neighboring plots remains unchanged, whereas when the absolute value of said difference is less than the predetermined altitude difference value, the new number of neighboring plots is calculated from the preceding number of neighboring plots by adding one thereto.

In an example, the rejection threshold value is a function of the number of measurement signals sent by the detector means into a slice of plot mesh, the slice being of thickness equal to the predetermined altitude difference value and of width equal to the width of the plot mesh.

In an example, said number Nct of measurement signals sent is obtained by the following equation:

$$Nct = Nc[La/(FOVaz \cdot dH)][Eps/(FOVel \cdot dH)]$$

Nc being the total number of measurements performed by the detector means in a given time interval;

FOVaz and FOVel designating respectively the azimuth angle and the elevation angle expressed in radians of the detector means relative to the slice of the terrain mesh;

Eps being the predetermined altitude difference value;

dH being the distance of the slice of the terrain mesh from the detector means; and La being the width of the mesh.

In an example, the rejection threshold value Nthresh is calculated as a function of said number of measurement signals sent using the following equation:

$$N\text{thresh} = A + Int(Nct/B)$$

Nct being the total number of measurement signals sent by the detector means in a given time interval towards the slice of plot mesh;

Int being the integer portion function with its variable being the number of measurement signals sent; and A and B being constants determined as a function of the probabilities of detecting true and false echoes.

In a first alternative, the rejection threshold value may be calculated using the following equation:

$$N\text{thresh} = A + Int[(Nc(20/dH)(20/dH)/B]$$

A and B being constants determined as a function of the probabilities of detecting true and false echoes;

Nc being the total number of measurements taken by the detector means in a given time interval;

dH being the range of the terrain mesh from the detector means; and

Int being the integer portion function depending on Nc and dH.

In a second alternative, the threshold value is calculated using one of the following equations:

$$N\text{thresh} = F(dH)$$

or $$N\text{thresh} = F(dH^2)$$

dH being the range of the terrain mesh from the detector means; and

F being the integer portion function depending on dH or $dH^2$.

In an example, the step of applying a two-dimensional grid to the terrain in a horizontal plane is performed using at least two arrays of meshes presenting a mutual geographical offset, a memory storage step being specified for each of the arrays, the plot mesh that is retained for preparing the terrain elevation database being a mesh that is not rejected from amongst the arrays and that presents the highest respective maximum altitude of the arrays.

In an example, the geographical offset is a staggered offset.

In an example, the step of storing in memory comprises at least two storage steps (also referred to as sub-steps) performed independently and with a time offset, and the reinitialization of said steps is performed periodically and in alternation as a function of time, the plot mesh retained for preparing the terrain elevation database being the non-rejected plot mesh from one of the preceding steps that presents the respective greatest maximum altitude.

In an example, the time offset is based on a number of measurement signals sent into the slice of the plot mesh under consideration of thickness that corresponds to the predetermined altitude difference value and of width equal to the width of the plot mesh, a step or a sub-step being reinitialized when the other step or sub-step has reached a predetermined reinitialization value of measurement signals sent.

In an example, prior to the step of storing a newly-sent plot, the method includes a step of transforming the coordinates of said plot from the frame of reference of said on-board detector means to a local geographical frame of reference, while taking account of harmonization errors and of the roll, pitch, and geographical heading angles of the vehicle.

The invention also provides a program including code stored on a medium or embodied by a signal, the code being readable or executable by a data processor unit on board a vehicle or suitable for mounting on board a vehicle for the purpose of processing range images picked up by detector means, said code including code segments for performing the steps of such a method.

Finally, the invention provides a device for obtaining a local terrain elevation database for implementing such a method, the device, which is on board or suitable for being mounted on board a vehicle, comprising detector means outputting distance images made up of a plurality of raw plots in a frame of reference relative to said detector means, an attitude and heading reference system, and a geographical positioning system associated with the vehicle on which the device is mounted, these three elements transmitting their data to a data processor unit that transforms the raw plot coordinates into a local geographical frame of reference, said data processor unit also being connected to at least one plot memory, wherein the data processor unit filters out false echoes contained in the plot memory by eliminating them at least in part and uses the remaining plots to develop a digital terrain model that is stored in a specific memory.

The technical effect of the present invention is reducing the size of memory allocated to storing plots. Since false echoes are not corrected but are rejected together with the mesh containing them, the calculation time required by the device for preparing a terrain database is thus reduced and suitable for real-time processing, with an ordinary processor.

The terrain elevation database may serve to construct a safety cordon that can be viewed in a head-up display to assist the pilot or the driver of the vehicle to control the vehicle so as to avoid any collision with relief and obstacles or so as to generate visible and audible warnings, as a function of a three-dimensional predictive path.

BRIEF DESCRIPTION OF THE DRAWINGS

The invention is described below in greater detail in non-limiting manner with reference to the accompanying figures, in which.

DETAILED DESCRIPTION OF THE PREFERRED EMBODIMENT

The inventive method of obtaining a local terrain elevation database using detector means on board a vehicle comprises a step in which said terrain is subdivided into multiple grids of meshes.

The vehicle may be an aircraft, however the invention also applies to other vehicles.

Figure 1:
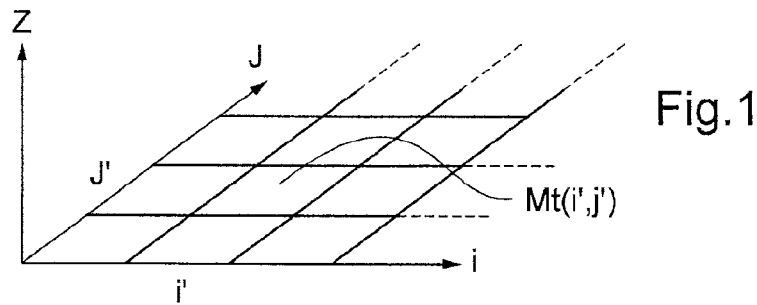
FIG. 1 is a diagram of a simple terrain grid for which the elevation database is to be prepared, in accordance with the present invention.

FIG. 1 shows one possible grid in a method in accordance with the present invention. For example, and without this being limiting, one such grid may be made up of 1000×1000 meshes each having dimensions of 10 meters (m)×10 m and coordinates i and j. By way of illustration, the mesh Mt(i',j') shown in FIG. 1 designates a mesh of abscissa coordinate i' and ordinate coordinate j'. At least two plot meshes are provided that present a geometrical offset.

The detector means present in the device for implementing the method send measurement signals over this terrain grid, retrieves echoes of them, and outputs distance images made up of a plurality of individual sent plots, expressed in the form of three-dimensional coordinates, these plots being stored in memory in the device.

This terrain grid is thus associated with a stored grid in order to produce the elevation database after processing. The grid is constructed of two-dimensional meshes in the horizontal plane with a geometrical offset. Over a period of time, each mesh receives measurement signals coming from the detector means, these measurement signals being in the form of plots, as described in detail below.

Throughout the description below, this stored grid relating to receiving plots is referred to as a geometrically offset plot grid, and each base mesh of coordinates $\underline{i}$ and $\underline{j}$ is referenced M(i,j), and referred to as a plot mesh.

This first step of the method is followed in certain examples by various other steps that are described, but that are not essential for the present invention.

A second step relates to acquiring a measurement plot in the frame of reference of the on-board detector means. The coordinates of the plot in this frame of reference are transformed relative to a local geographical reference, i.e. the latitude, the longitude, and the altitude of the plot are determined.

This may be performed in a plurality of sub-steps.

For example, in the frame of reference of the on-board detector means, the coordinates of a plot are established in spherical coordinates as a function of angular tilt, relative bearing, and range. These coordinates are transformed in a first sub-step into Cartesian coordinates in the frame of reference of the detector means, i.e. the frame of reference of the sensor of the obstacle warning system (OWS) on board the vehicle.

Thus, with $\underline{t}$ for tilt, $\underline{b}$ for bearing, and $\underline{r}$ for range, the transformation into Cartesian coordinates in the sensor (OWS) frame of reference or the equipment frame of reference, represented by variables $\underline{x}$, $\underline{y}$, and $\underline{z}$ is obtained using the following equations:

$$x = r\cos(t)\cos(b)$$

$$y = r\cos(t)\sin(b)$$

$$z = -r\sin(t)$$

Thereafter, when the device is on board an aircraft, the coordinates are transferred into Cartesian coordinates x, y, and z in the aircraft frame of reference (Pca) taking account of harmonization errors (Hrm in the form of a matrix having dimensions 3×3) and of the lever arm (Bdl in the form of a vector of dimension 3).

$$x = Hrm[0][0]x + Hrm[0][1]y + Hrm[0][2]z + Bdl[0]$$

$$y = Hrm[1][0]x + Hrm[1][1]y + Hrm[1][2]z + Bdl[1]$$

$$z = Hrm[2][0]x + Hrm[2][1]y + Hrm[2][2]z + Bdl[2]$$

Thereafter, the coordinates are transferred from the aircraft frame of reference (Pca) to a ground frame of reference (Ps). This is done by calculating the coordinate changing matrix M depending on the roll angle Phi, the pitch angle Theta, and the geographical heading Psi:

$M[0][0]$=cos(Theta)cos(Psi)

$M[0][1]$=−cos(Phi)sin(Psi)+cos(Psi)sin(Theta)sin(Phi)

$M[0][2]$=sin(Phi)sin(Psi)+cos(Psi)sin(Theta)cos(Phi)

$M[1][0]$=cos(Theta)sin(Psi)

$M[1][1]$=cos(Phi)cos(Psi)+sin(Psi)sin(Theta)sin(Phi)

$M[1][2]$=−sin(Phi)cos(Psi)+sin(Psi)sin(Theta)cos(Phi)

$M[2][0]$=−sin(Theta)

$M[2][1]$=cos(Theta)sin(Phi)

$M[2][2]$=cos(Theta)cos(Phi)

Finally, the ground coordinates are transferred into the local geographical axis system with Z>0 pointing downwards, and with the plot coordinates Xplot, Yplot, and Zplot obtained as follows:

$X\text{plot}=M[0][0]x+M[0][1]y+M[0][2]z$ $Y\text{plot}=M[1][0]x+M[1][1]y+M[1][2]z$ $Z\text{plot}=M[2][0]x+M[2][1]y+M[2][2]z-Z$ Z being the current altitude.

The third step following the second step in an example of the method, i.e. after preparing in the local terrestrial geographical frame of reference of the plot, is a storage step proper specific to each of the ground grid arrays with their plot grid measurements. Within each mesh of this plot grid there are measurements coming from the detector means and corresponding to an associated terrain mesh.

A measurement performed on the terrain mesh is thus associated with an individual plot that is stored in a corresponding plot mesh of at least one memory, referred to as the plot memory. The location of the plot received in this plot memory is determined by the coordinates i and j of the mesh to which the plot belongs.

During the storage step, each plot mesh $M(i,j)$ contains acquired plots, each presenting at least one respective altitude measured along the z axis perpendicular to the plane of the meshes. For each plot mesh, there are stored in memory both the altitude of the highest plot, written $Z\max(i,j)$, and also the number of plots adjacent to said plot in the plot mesh under consideration $M(i,j)$, said number being written $N(i,j)$.

The term "neighboring" plot is used to mean a plot in the same plot mesh $M(i,j)$ for which the absolute value of the difference between its altitude and the altitude of the highest plot, referred to as the maximum altitude and written $Z\max(i,j)$, is less than a predetermined value Eps.

Figure 2:
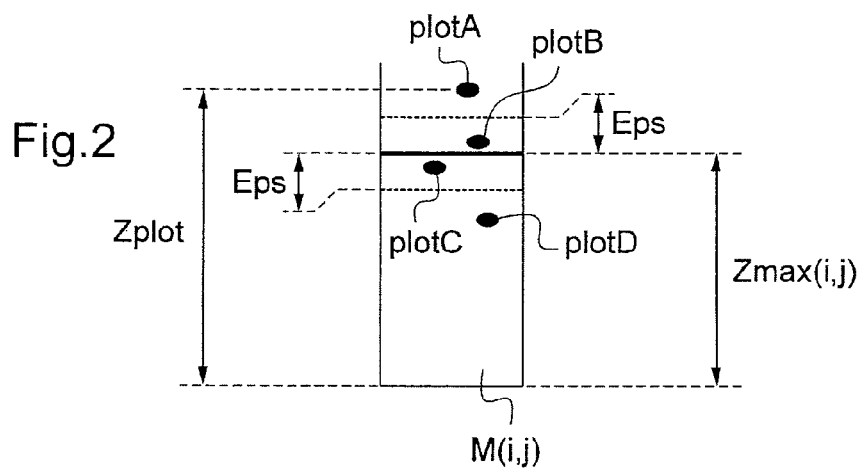
FIG. 2 is a diagram along the z axis of FIG. 1 for a given mesh showing various circumstances in which newly-sent plots are accepted, the plots presenting different altitudes, and acceptance thereof being determined in accordance with the invention.

FIG. 2, for a given plot mesh $M(i,j)$, shows examples of newly-sent plots, these plots presenting different altitudes. This figure thus relates essentially to the fourth and fifth steps of the method.

The fourth step of storing the plot meshes $M(i,j)$ in memory, each associated with the stored altitude of the highest plot $Z\max(i,j)$ in the mesh and the number $N(i,j)$ of plots neighboring said plot in said mesh, then comprises, when storing a newly-sent plot from the detector means, calculating the difference dZ between the altitude Zplot of said plot and the maximum altitude $Z\max(i,j)$ previously stored in the mesh $M(i,j)$ under consideration.

This difference is obtained using the following equation:

$dZ=Z\text{plot}-Z\max(i,j)$

Each time a new plot is sent, the maximum altitude $Z\max(i,j)$ and the number $N(i,j)$ of plots neighboring the maximum altitude plot are thus updated. Depending on the data concerning the newly-sent plot, the maximum altitude may thus be modified to a higher maximum altitude of said plot and/or the number $N(i,j)$ of neighboring plots may also be modified.

For example, in the situation shown in FIG. 2, this number $N(i,j)$ may be reinitialized to zero or to some other value, depending on the newly-sent plot, as described below.

The fifth step consists in updating the information stored in the plot mesh as a function of the plot newly sent to said mesh.

Still with reference to FIG. 2, the various possible circumstances can be seen more clearly.

As shown by the plot referenced PlotA in this figure, if the newly-sent plot presents an altitude ZplotA that is higher than the plot that previously had the maximum altitude $Z\max(i,j)$ for this mesh, then the difference dZ is positive. This newly-sent plot then becomes the highest in the plot mesh $M(i,j)$ and replaces the plot that previously had the maximum altitude.

Since $dZ=Z\text{plotA}-Z\max(i,j)$ is greater than or equal to the value Eps used to determining whether a plot is a neighbor to the plot presenting the maximum altitude, the number $N(i,j)$ of plots neighboring the maximum altitude plot is re-updated relative to the plot PlotA. This plot does not have a neighbor since the plot nearest thereto is the previous maximum altitude plot and the altitude difference between them is greater than the value Eps.

Thus, for the plot PlotA, the data stored in the plot memory is updated as follows:

$Z\max(i,j)=Z\text{plotA}$ $N(i,j)=0$

For the plot PlotB, the following applies:

$0<Z\text{plotB}-Z\max(i,j)<Eps$

The newly-arrived plot PlotB then becomes the highest plot in the plot mesh $M(i,j)$ and it replaces the plot that previously had the maximum altitude. This plot with the previous maximum altitude is considered as being a neighbor to the plot PlotB.

Thus, for the plot PlotB, the data stored in the memory is updated as follows:

$Z\max(i,j)=Z\text{plotB}$ $N(i,j)\text{new}=1+N(i,j)\text{old}$ where $N(i,j)$old is the previous number of plots neighboring the maximum altitude plot $Z\max(i,j)$ prior to the introduction of the plot PlotB.

In a variant, $N(i,j)=1+E(N(i,j)/2)$ where $E(N(i,j))$ is an arbitrary integer portion function taking account of the plots neighboring the old maximum altitude plot.

For the plot PlotC, the following applies:

$0<dz=Z\text{plotC}-Z\max(i,j)$ and the absolute value of dz, i.e. |dz| less than or equal to Eps.

The maximum altitude plot $Z\max(i,j)$ of the plot mesh $M(i,j)$ then remains unchanged, and the plot PlotC is incorporated into the plots neighboring the maximum altitude plot $Z\max(i,j)$.

Thus, for the plot PlotC, the data stored in the memory is updated as follows:

No updating for Zmax(i,j)

$$N(i,j)\text{new}=1+N(i,j)\text{old}$$

where N(i,j)old is the previous number of plots neighboring the maximum altitude plot Zmax(i,j) before introducing the plot PlotC.

For the plot PlotD, the following applies:

$$0>dz=Z\text{plotD}-Z\text{max}(i,j)$$

and the absolute value of dz, i.e. |dz|, greater than Eps.

The plot presenting the maximum altitude, Zmax(i,j), in the plot mesh M(i,j) thus remains unchanged, and the plot PlotD is not incorporated in the plots neighboring the maximum altitude plot Zmax(i,j).

Thus, for the plot PlotD, the data stored in the memory remains unchanged.

It should not be forgotten that the term "updating" does not necessarily imply making any modification to the value for the maximum altitude Zmax(i,j) and/or for the number of neighboring plots N(i,j).

Thus, when the maximum altitude and the number of plots are updated, this may lead to maintaining the maximum altitude and/or maintaining the number of plots, as shown above for the plot PlotD, or it may lead to modifying only the value for the number of neighboring plots, as shown above for the plot PlotC, or it may lead to modifying both the maximum altitude and the number of neighboring plots, as shown above for the plots PlotA and PlotB, where the number of plots may possibly be reset to zero.

The sixth step of the method concerns filtering the plot memory. This filtering is performed by reading the memory and rejecting plot meshes that might contain the altitude of a false echo. At the end of this step, the digital terrain model as prepared at this instant for serving as the local terrain elevation database is obtained.

During this step, the plot memory is scanned and the plot meshes M(i,j) in which the number of neighbors to the maximum altitude plot is less than a predetermined rejection threshold value are not taken into account in the digital model that is being prepared.

The value of the predetermined rejection threshold may be determined in various ways. This predetermined rejection threshold value may be calculated empirically or by making use of theory.

For example, it may be a function of the number of measurement signals sent by the detector means for the mesh or a portion of said mesh, in application of an appropriate probability theory. This number of measurement signals, also referred to as the number of hits made by the detector means in a mesh, is generally greater than the number of measurement signals returned by obstacles to the detector means, i.e. the number of plots received and recorded by said detector means.

Figure 3A:
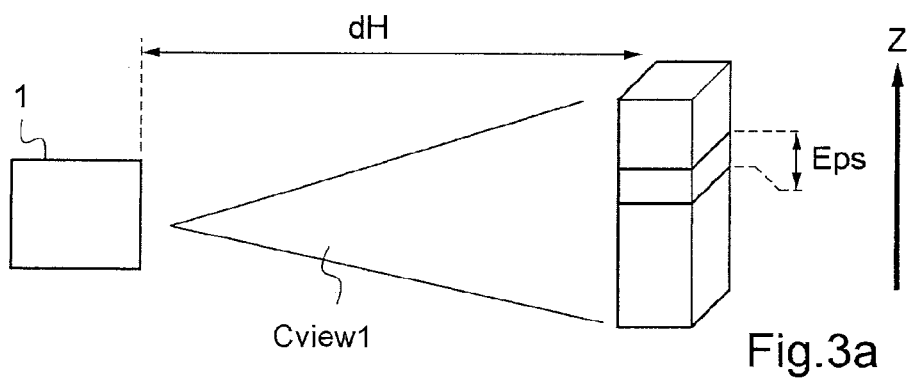
FIGS. 3a and 3b are a diagram of a measurement being taken by the detector means 1 in a given terrain mesh, with this applying respectively in FIG. 3a in the vertical direction of the terrain mesh for acquiring the altitudes of plots, and for FIG. 3b in the base of the mesh.
Figure 3B:
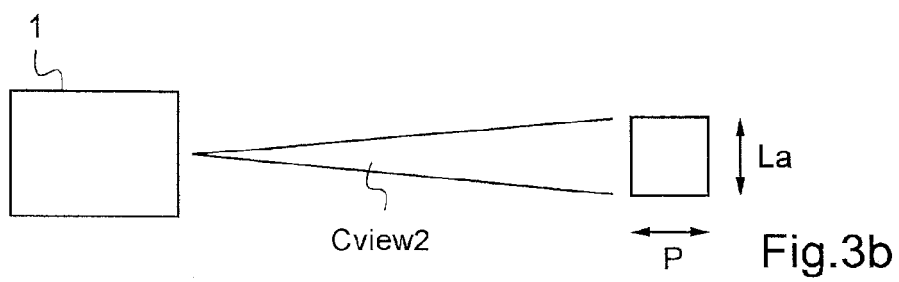

An example of such determination is shown with reference to FIGS. 3a and 3b.

FIGS. 3a and 3b show measurements being taken by the detector means 1 in a given terrain mesh.

FIG. 3a relates to measuring altitude up the z axis as shown in FIG. 1, with the value Eps that will be used subsequently for determining whether a newly-sent plot counts as the highest altitude plot or as a plot neighboring the plot having the highest altitude in the plot mesh M(i,j), as described above with reference to FIG. 2.

FIG. 3b relates to the i and j coordinates as shown in FIG. 1 in the plane of the terrain mesh. In FIG. 3b, the reference La designates the width of the terrain mesh base taken in the direction of the j axis in FIG. 1.

In FIGS. 3a and 3b, Cview1 and Cview2 designate respectively, starting from the detector means 1, the field of view in elevation and the field of view in azimuth, FOVaz and FOVel designating respectively the azimuth angle and the elevation angles, these angles being expressed in radians.

Taking as the reception portion a slice of thickness Eps in the terrain mesh of width La, when the terrain mesh is illuminated by the detector means 1, the increment in the number Nct of measurement signals sent into the corresponding plot mesh slice is a function of the distance dH of the terrain mesh from the detector means 1.

The following equation is obtained for the number Nct of measurement signals sent into this plot mesh slice while scanning said mesh:

$$Nct=Nc[La/(FOVaz\,dH)][Eps/(FOVel\,dH)]$$

Where Nc is the number of measurements performed by the detector means 1 in a time interval. This value Nc is a function of the execution period of the measurement-taking algorithm implemented by the detector means 1. This value is also predetermined as a function of data from the manufacturer of the detector means 1.

The other values in the equation are defined above.

As an order of magnitude, without this being limiting, for a complete scan, the following may apply:

dH=500 m
La=10 m
FOVel=FOVaz=0.5 rad
Eps=10 m
Nct=10,000

Under such circumstances, Nct=16.

From the number Nct of measurement signals sent as determined for a plot mesh, a predetermined rejection threshold value Nthresh is determined using the equation:

$$N\text{thresh}=A+Int(Nct/B)$$

Where Int is the integer portion function and where A and B are determined as a function of the probabilities of detecting false and desired echoes. This value may be determined by empirical testing or by applying theory (e.g. radar theory and/or Bayes' theorem).

Let N(i,j) be the number of neighboring points in a plot mesh, if N(i,j)<Nthresh, then the plot mesh is not taken into account in the numerical model that is being prepared, whence the term "predetermined rejection threshold value" for Nthresh.

By way of non-limiting example, A may be equal to 2 and B to 5.

Other ways of calculating the predetermined rejection threshold Nthresh may be considered.

In a first variant, the following equation is obtained for the rejection value Nthresh:

$$N\text{thresh}=A+Int[(Nc(20/dH)(20/dH)/B]$$

where:
Int( ) is the integer portion function;
A and B are constants;
dH is the range of the terrain mesh from the detector means 1; and
Nc is as defined above, being the number of measurements made by the detector means within a time interval.

In second and third variants, the rejection value Nthresh is obtained respectively by the following equation:

$$N\text{thresh}=F(dH)$$

or $$N\text{thresh} = F(dH^2)$$

where F( ) is the integer portion function for dH or $dH^2$ as the distance of the terrain mesh from the detector means.

There follows a description of several possible variants of the present invention.

In one variant of the present invention, there may be more than two plot memories, e.g. there may be three plot memories.

Under such circumstances, it is possible in the method of the present invention to make use of a plot mesh with a pure time offset memory or based on the number of measurement signals sent by the detector means to a reference plot mesh.

It is also possible to use a two-memory mesh with a geographical offset, e.g. a staggered configuration. This is described below with reference to FIG. 4.

Such variants serve to reduce the probability of having holes in the final plot mesh, which may occur in the event of there being a large number of invalid plot meshes that need to be rejected.

Both variants may be associated, i.e. it is possible to associate a geographical offset with a pure time offset or an offset based on the number of measurement signals sent.

The last step of the method consists in preparing the local terrain elevation database on the basis of the plot meshes (M(i,j)) that were not rejected by the preceding step.

When using a plurality of memories, in general two memories, a resulting terrain elevation database is constructed taking account of plot meshes that may be compared, each coming from a respective memory. The plot mesh taken into account for the resulting terrain elevation base is the mesh that satisfies the following two conditions. Firstly, the plot mesh is valid in the meaning of the sixth step of the method, i.e. it has not been rejected for having a number of neighboring plots that is below a predetermined threshold value. Secondly, this plot mesh presents the highest altitude amongst the plot meshes that are compared from respective plot memories.

Figure 4:
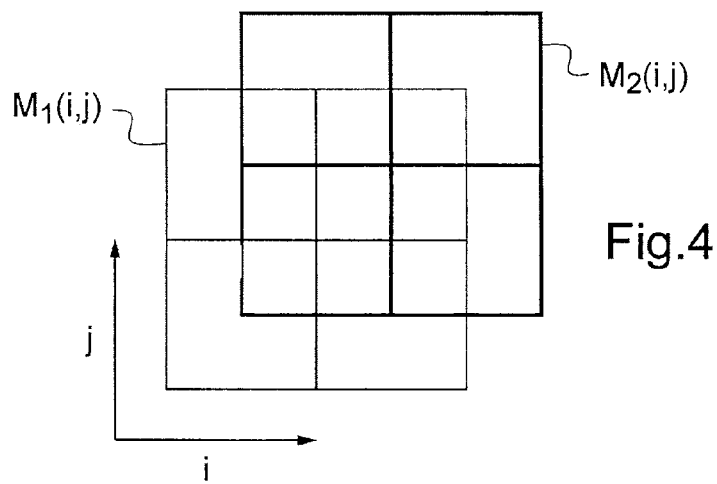
FIG. 4 is a diagram of a possible variant of the invention in which two plot memories are used, each corresponding to one mesh, the two meshes of the plot memories being offset in a staggered configuration.

FIG. 4 shows the use of two plot memories each associated with a respective plot mesh M1(i,j) and M2(i,j), these two plot meshes presenting a staggered geometrical offset.

The two plot meshes M1(i,j) and M2(i,j) shown in this figure have an overlapping portion in common, and each has a respective distinct portion.

Thus, the final grid that is obtained is twice as fine. As mentioned above, the plot mesh finally retained from the two plot meshes M1(i,j) and M2(i,j) for the digital terrain model or DTM is that one of the two memories that has not been rejected for having a neighboring plot value below a rejection threshold value and that presents the higher altitude.

In the description below:

AltMeshk(i,j) represents the altitude of the highest plot in the plot mesh k of coordinates i and j;

Int( ) is an integer portion function;

AltDTM(i,j) represents the maximum altitude of the digital terrain model that results for the plot mesh M(i,j); and Max(x,y) is the function that returns the maximum of the two variables in parentheses.

For the three plot meshes Mesh(i,j), Mesh1(i,j), and Mesh2 (i,j) Under consideration:

i and j are the coordinates of a grid lying in the range 0 to n;
i and j of the grid 1 lie in the range 0 to Int(n/2);
i and j of the grid 2 lie in the range 0 to Int(n/2).

When making a new grid, the following equations are obtained:

i lying in the range 0 to n−1, AltMesh(i,0)=AltMesh1 (Int(i/2),0);

j lying in the range 0 to n−1, AltMesh(0,j)=AltMesh1 (Int(j/2));

j lying in the range 1 to n, AltMesh(n,j)=AltMesh2(Int (n−1)/2),Int((j−1)/2); and i lying in the range 1 to n, AltMesh(i,n)=AltMesh2(Int (i−1)/2),Int((j−1)/2).

By generalizing these equations, the following is obtained:

AltMesh(n,n)=AltMesh2(Int((n−1)/2),Int((n−1)/2))

The maximum altitude for a plot mesh is given by comparing the plot meshes that present portions in common. By way of example:

AltMesh(2,2)=MAX[AltMesh1(1,1),AltMesh2(0,0]

AltMesh(3,2)=MAX[AltMesh1(1,1),AltMesh2(1,0]

AltMesh(2,3)=MAX[AltMesh1(1,1),AltMesh2(0,1]

AltMesh(3,3)=MAX[AltMesh1(1,1),AltMesh2(1,1]

AltMesh(3,2)=MAX[AltMesh1(1,1),AltMesh2(1,0]

AltMesh(4,3)=MAX[AltMesh1(2,1),AltMesh2(1,1]

The general formula with i and j lying in the range 1 to n−1 is as follows:

AltMesh(i,j)=MAX[AltMesh1(Int(i/2),Int(j/2),AltMesh2(Int((i−1)/2),Int((j−1)/2)]

The plot meshes that are to be rejected, in which the number of plots neighboring the plot having the highest altitude in said mesh lies below a rejection threshold value, are not taken into consideration.

For the maximum altitude of the resulting digital terrain model for the plot mesh M(i,j) from i=j=0 to i=j=Int(n/2), the following is obtained:

AltDMT(i,j)=MAX[AltMesh(2i,2j),AltMesh(2i,2j+1), AltMesh(2i+1,2j),AltMesh (2i+1, 2j+1)]

Another variant of the present invention is based on a pure time offset between different plot memories, e.g. between two plot memories, referred to as first and second plot memories.

In this variant, the two memories are geographically superposed and they are reinitialized periodically and in alternation as a function of time so that firstly any stored false echoes have a limited lifetime and secondly there is always a plot memory available for the processor unit of the device implementing the method of the present invention.

It is possible to take a reinitialization period that is equal to two complete scans of the detector means, for example.

The plot mesh that is finally retained for the digital terrain model (DTM) is that one of the two memories that is valid and that presents the higher altitude.

The process of reinitializing the memories over time may be as follows:

at instant T0: reinitializing the first plot memory setting therein Z1max(i,j)=0 and N1(i,j)=0;

at instant T0+ΔT: reinitializing the second plot memory setting therein Z2max(i,j)=0 and N2(i,j)=0;

at instant T0+2ΔT: reinitializing the first plot memory setting therein Z1max(i,j)=0 and N1(i,j)=0; and so on.

In one example, the period ΔT may be the scanning period of the detector means.

A preferred application of a two-memory variant with pure time offset is based on the number of plots sent by the detector means.

Figure 5A:
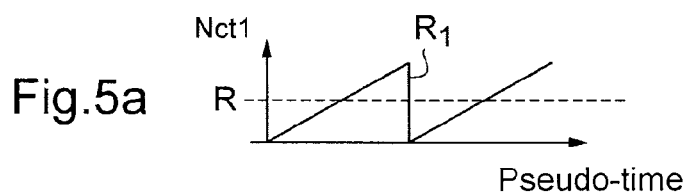
FIGS. 5a and 5b apply to another possible variant of the invention, each showing a curve as a function of time for the number of plots sent by the detector means concerning a mesh, for two respective plot memories, the two plot memories having a time offset.
Figure 5B:
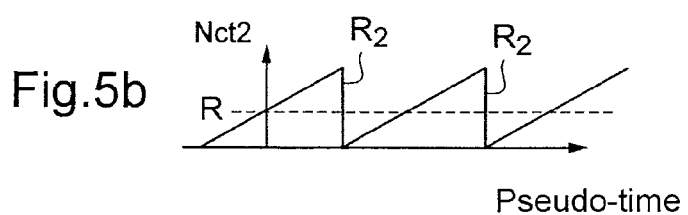

FIGS. 5a and 5b show this preferred application.

For a first plot memory, FIG. 5a shows the number Nct1 of measurement signals sent by the detector means into a plot mesh M(i,j) as a function of time.

For a second plot memory, FIG. 5b shows the number Nct2 of measurement signals sent by the detector means into a plot mesh M(i,j) as a function of time.

It is recalled that the number of measurement signals sent enables the plot mesh in question to be validated when said number Nct1 or Nct2 is greater than a rejection threshold value Nthresh. Otherwise, the plot mesh as stored in plot memory 1 or 2 is rejected.

In a variant, the above-mentioned time offset process is based on the number Nct of measurement signals sent by the detector means into the slice of the plot mesh under consideration, as described above with reference to FIGS. 3a and 3b. This number increases with time, given that the detector means scan the same zone of a terrain mesh several times over and that all of the plots can be cumulated in a given plot memory, providing the conditions for accepting each of the plots in memory are satisfied.

Reinitializing R1 or R2 the plot memories as a function of the number of measurement signals sent enables them to be emptied periodically, thus serving to regularly eliminate false echoes, which is particularly advantageous for an on-board real-time application.

Clearly, when there are two plot memories, the reinitialization R1 or R2 of either one of these memories is performed in a manner that is not simultaneous with the reinitialization of the other one. This produces the process shown in FIGS. 5a and 5b which seesaws and has two flags.

The seesaw system enables the plot memories to be reinitialized in alternation. When the number Nct1 or Nct2 of measurement signals sent into a plot mesh M(i,j) in one of the memories is greater than a determined rejection threshold value, the other memory is reinitialized and the number Nct2 or Nct1 of measurement signal sent is reset to 0. There is thus a deliberate time offset between the reinitializations R1 and R2 of the plot memories.

When the number of measurement signals sent into the plot mesh M(i,j) has reached a predetermined value, said mesh is reinitialized.

The number of measurement signals sent may be calculated using the formula:

$$Nctnew = Nct + Nc[La/(FOVaz \cdot dH)][Eps/(FOVel \cdot dH)]$$

using the same parameters La, FOVas, FOVel, dH, Eps, and Nc as described above with reference to FIGS. 3a and 3b, Nctnew being the updated number of measurement signals sent and Nct being the preceding number.

With reference to FIGS. 5a and 5b, if the number Nct1 of measurement signals sent for the first plot memory in FIG. 5a is greater than a constant R, then the second plot memory is reinitialized and the number Nct2 of measurement signals sent for this memory is reset to 0, as shown in FIG. 5b. The flag of the mesh M(i,j) of the second plot memory is reset to zero while the flag of the mesh M(i,j) of the first plot memory is set to 1.

The process is the other way when the number Nct2 of measurement signals sent for the second plot memory becomes greater than a constant R.

As in the other variants described, of the plot meshes M(i,j) stored in respective ones of the plot memories, the plot mesh M(i,j) that is retained is the mesh that is both valid and that presents the higher maximum altitude.

If the detector means are on board a vehicle, these operations of reinitializing the memories need to be performed periodically in real pseudo-time, e.g. at the frequency of one complete scan.

The invention also provides a device for implementing the above-described method and a program housed in the processor unit of said device and enabling the steps of the method of the invention to be performed. The device is shown in FIG. 6.

In the description below, the following conventional abbreviations are used:
AHRS: attitude and heading reference system;
GPS: global positioning system;
INS: inertial navigation system;
LIDAR: light detection and ranging:
RADAR: radio detection and ranging:
IMU: inertial measurement unit; and
DTM: digital terrain model.

Reference 1 designates the detector means in the form of a telemeter sensor. This may be in the form of a radar or lidar telemeter or a stereoscopic imaging system. The detector means 1 transmit data to a processor unit 4, which data constitutes range images made up of pluralities of individual plots, expressed in the form of raw coordinates, i.e. spherical coordinates in terms of tilt, bearing, and range, as mentioned above.

Figure 6:
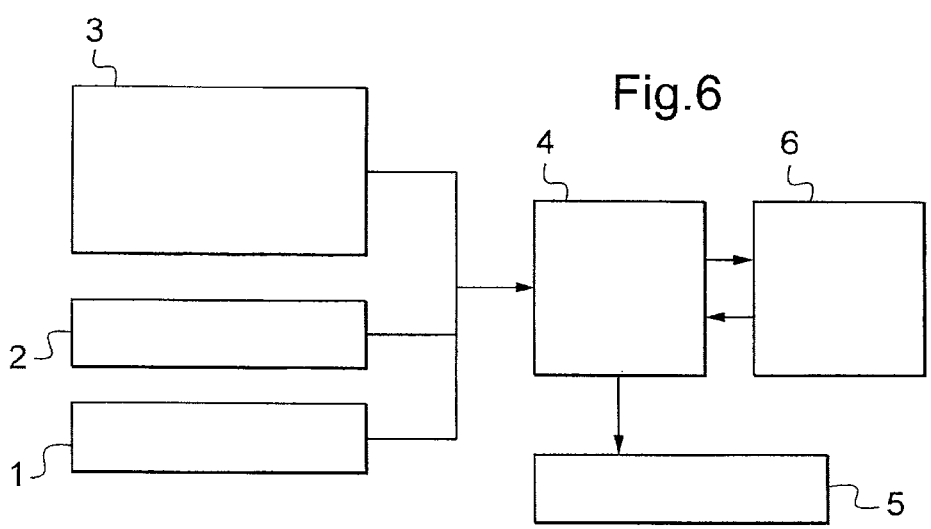
FIG. 6 is a block diagram of the device of the present invention for implementing the above-described method.

The attitude and heading reference system (AHRS) referenced 2 in FIG. 6, delivers attitude information for the vehicle, i.e. information concerning roll, pitch, and yaw.

Reference 3 relates to the global positioning system making use of satellites with an inertial sensor or an inertial navigation system. This system may comprise a GPS/IMU or an INS. A radio detection and telemetry system, in particular a Doppler radar that gives ground speeds may also be used under the reference 3, providing its algorithm is adapted appropriately.

The system 3 provides the geographical coordinates of the locating means, i.e. the latitude, the longitude, and the altitude thereof.

In the data processor unit 4, the raw coordinates of the plots are transformed into ground coordinates using the data transmitted by the AHRS 2 and the positioning system 3.

The plots as modified in this way are stored in the so-called "plot memory" 6. It is also possible to have a plurality of plot memories 6 as mentioned above. The memory 6 presents a set of plot grids as described above.

In accordance with the invention, the device of the present invention implements the above-described method and the data processor unit 4 filters out false echoes contained in a given mesh in at least one of the plot memories 6 by eliminating them at least in part and by using the remaining plots to develop a digital terrain model (DTM), which is stored in the memory referenced 5.

False echoes are filtered by the data processor unit 4 reading the memory or each plot memory 6. Only those meshes that have not been rejected are incorporated into the digital terrain model (DTM).

It goes without saying that various additions, omissions, or modifications may be applied by the person skilled in the art to the various embodiments described above, both in terms of structural elements and in terms of functional components, without thereby going beyond the ambit of the present invention.

What is claimed is:

1. A method of obtaining a local terrain elevation database from detector means on board a vehicle, said means sending measurement signals towards the terrain for which the database is to be determined and recovering at least some of said signals in the form of range images made up of a plurality of individual plots expressed in the form of three-dimensional coordinates, said method comprising, for the purpose of correcting false echoes by filtering them out:

a step of subdividing said terrain in a horizontal plane grid using two-dimensional terrain meshes in a local geographical frame of reference; the horizontal grid-making step using at least two arrays of plot meshes that are mutually geographically offset such that two offset plot meshes share a portion in common and each has a respective distinct portion;

wherein a neighboring plot is a plot in the same plot mesh as the highest altitude plot and the absolute value of the difference between its altitude and the altitude of said highest altitude plot is less than a predetermined value: a step of storing each terrain mesh in a plot mesh with a specific sub-step for each of the arrays, each stored plot mesh receiving from the detector means the plots it has sent and retaining in memory at least the altitude of the highest plot and the number of plots neighboring said highest plot in said plot mesh, said altitude and said number being updated for each plot newly sent into the plot mesh;

a step of rejecting plot meshes that present a number of neighboring plots that is less than a predetermined rejection threshold value; and a step of preparing the local terrain elevation database from the non-rejected plot meshes; in which step false echoes contained in the plot memory are filtered out; the plot mesh retained for preparing the terrain elevation database being that one of the non-rejected plot meshes amongst the arrays that presents the greatest respective maximum altitude; and a digital terrain model is developed from the remaining plots.

2. A method according to claim 1, wherein the altitude of the highest plot is updated when the newly-sent plot presents an altitude that is greater than the altitude of the previously stored highest plot.

3. A method according to claim 2, wherein the number of neighboring plots is updated when the newly-sent plot presents an altitude difference relative to the altitude of the previously stored highest plot having an absolute value that is less than a predetermined altitude difference value.

4. A method according to claim 3, wherein when the newly-sent plot presents an altitude greater than the altitude of the previously stored highest plot, and when their altitude difference exceeds the predetermined altitude difference value, the number of neighboring plots is reset to zero, whereas when said difference is less than the predetermined altitude difference, the new number of neighboring plots is calculated from the preceding number of neighboring plots using the following equation:

$N(i,j)new = 1 + N(i,j)old$,

Wherein: $N(i,j)new$ is the new number of neighboring, and $N(i,j)old$ is the preceding number of neighboring plots.

5. A method according to claim 3, wherein when the newly-sent plot presents an altitude that is lower than the altitude of the previously stored highest plot and when the absolute value of the difference exceeds the predetermined altitude difference value, the number of neighboring plots remains unchanged, whereas when the absolute value of said difference is less than the predetermined altitude difference value, the new number of neighboring plots is calculated from the preceding number of neighboring plots by adding one thereto.

6. A method according to claim 3, wherein the rejection threshold value is a function of the number of measurement signals sent by the detector means into a slice of plot mesh, the slice being of thickness equal to the predetermined altitude difference value and of width equal to the width of said mesh.

7. A method according to claim 6, wherein said number of measurement signals sent is obtained by the following equation:

$Nct = Nc[La/(FOVaz \cdot dH)][Eps/(FOVel \cdot dH)]$, wherein:

Nct is the number of measurement signals sent;

Nc being the number of measurements performed by the detector means (1) in a given time interval;

FOVaz and FOVel designating respectively the azimuth angle and the elevation angle expressed in radians of the detector means (1) relative to the slice of the terrain mesh ($Mt(i,j)$);

Eps being the predetermined altitude difference value;

dH being the distance of the slice of the terrain mesh ($Mt(i,j)$) from the detector means (1); and La being the width of the mesh.

8. A method according to claim 7, wherein the rejection threshold value is calculated as a function of said number of measurement signals sent using the following equation:

$Nthresh = A + Int(Nct/B)$; wherein:

Nthresh is the rejection threshold value;

Nct being the total number of measurement signals sent by the detector means in a given time interval towards the slice of plot mesh;

Int being the integer portion function with its variable being the number of measurement signals sent; and A and B being constants determined as a function of the probabilities of detecting true and false echoes.

9. A method according to claim 7, wherein the rejection threshold value is calculated using the following equation:

$Nthresh = A + Int[(Nc(20/dH)(20/dH)/B]$; wherein:

Nthresh is the rejection threshold value;

A and B being constants determined as a function of the probabilities of detecting true and false echoes;

Nc being the total number of measurements sent by the detector means in a given time interval;

dH being the range of the terrain mesh from the detector means; and

Int being the integer portion function depending on Nc and dH.

10. A method according to claim 7, wherein the rejection threshold value is calculated using one of the following equations:

$Nthresh = F(dH)$ or $Nthresh = F(dH^2)$; wherein:

Nthresh is the rejection threshold value;

dH being the range of the terrain mesh from the detector means; and

F being the integer portion function depending on dH or $dH^2$.

11. A method according to claim 10, wherein the geographical offset is a staggered offset.

12. A method according to claim 1, wherein the step of storing in memory comprises at least two storage sub-steps performed independently and with a time offset from reinitialization of the plot memories of said sub-steps taking place periodically and in alternation as a function of time; the plot mesh retained for preparing the terrain elevation database being the non-rejected mesh from one of the preceding steps that presents the respective greatest maximum altitude.

13. A method according to claim 12, wherein the time offset is based on a number of plots sent into the slice of the plot mesh under consideration of thickness that corresponds to the predetermined altitude difference value and of width equal to the width of the plot mesh, a step or a sub-step being reinitialized when the other step or sub-step has reached a predetermined reinitialization value of plots sent.

14. A method according to claim 1, wherein, prior to the step of storing a detected newly-sent plot, it includes a step of transforming the coordinates of said plot from the frame of reference of said on-board detector means to a local geographical frame of reference while taking account of harmonization errors and of the roll, pitch, and geographical heading angles of the vehicle.

15. A device for obtaining a local terrain elevation database for implementing the method according to claim 1, said device, which is on board or suitable for being mounted on board a vehicle, comprising detector means outputting distance images made up of a plurality of raw plots in a frame of reference relative to said detector means, an attitude and heading reference system, and a geographical positioning system associated with the vehicle, these means and systems transmitting their data to a data processor unit that transforms the raw plot coordinates into a local geographical frame of reference, said data processor unit also being connected to at least one plot memory, the data processor unit filtering out false echoes contained in the plot memory by eliminating them at least in part, and using the remaining plots to develop a digital terrain model that is stored in a specific memory.

* * * * *